United States Patent
Truong et al.

(10) Patent No.: US 10,282,684 B2
(45) Date of Patent: May 7, 2019

(54) PERFORMING SELECTIVE OPERATIONS BASED ON MOBILE DEVICE LOCATIONS

(71) Applicant: UBER Technologies, Inc., San Francisco, CA (US)

(72) Inventors: Michael Truong, San Francisco, CA (US); Iain Proctor, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 14/683,828

(22) Filed: Apr. 10, 2015

(65) Prior Publication Data

US 2016/0253617 A1    Sep. 1, 2016

Related U.S. Application Data

(60) Provisional application No. 62/121,212, filed on Feb. 26, 2015.

(51) Int. Cl.
| | | |
|---|---|---|
| G06Q 10/06 | (2012.01) | |
| G06Q 50/30 | (2012.01) | |
| H04B 1/3822 | (2015.01) | |
| H04W 4/02 | (2018.01) | |
| H04W 4/021 | (2018.01) | |

(52) U.S. Cl.
CPC ..... *G06Q 10/063114* (2013.01); *G06Q 50/30* (2013.01); *H04B 1/3822* (2013.01); *H04W 4/021* (2013.01); *Y04S 10/54* (2013.01)

(58) Field of Classification Search
CPC .. G06F 17/00; G06F 2221/2111; H04W 4/02; H04W 8/005; H04L 67/32; H04L 67/18; H04L 67/22; H04L 67/306
See application file for complete search history.

(56) References Cited

U.S. PATENT DOCUMENTS

| | | | |
|---|---|---|---|
| 5,945,919 A | * | 8/1999 | Trask ..................... G07B 13/00 235/384 |
| 6,356,838 B1 | | 3/2002 | Paul |
| 6,453,298 B2 | | 9/2002 | Murakami |
| 6,756,913 B1 | | 6/2004 | Ayed |

(Continued)

FOREIGN PATENT DOCUMENTS

| | | |
|---|---|---|
| EP | 2682868 | 1/2014 |
| EP | 2879410 | 6/2015 |

(Continued)

OTHER PUBLICATIONS

International Search Report and Written Opinion in PCT/US2016/019895 dated Jun. 29, 2016.

(Continued)

*Primary Examiner* — Jerrah Edwards
(74) *Attorney, Agent, or Firm* — Mahamedi IP Law LLP

(57) ABSTRACT

A system for performing selective operations based on location data provided by mobile computing devices is disclosed. The system can receive location information from individual mobile computing devices and can detect when a certain event occurs in connection with a mobile computing device, where the event is related to a particular geographic region. Based on whether the event occurs, the system can perform an operation for or in relation to the mobile computing device.

15 Claims, 6 Drawing Sheets

(56) References Cited

U.S. PATENT DOCUMENTS

| | | | |
|---|---|---|---|
| 7,248,184 B2 | 7/2007 | Gelhar | |
| 7,493,211 B2* | 2/2009 | Breen | G01S 5/0027 340/995.12 |
| 7,657,256 B2 | 2/2010 | Bates | |
| 7,817,990 B2 | 10/2010 | Pamminger | |
| 7,917,153 B2 | 3/2011 | Orwant et al. | |
| 8,065,342 B1 | 11/2011 | Borg | |
| 8,339,251 B2 | 12/2012 | Roberts | |
| 8,504,406 B2 | 8/2013 | Miller | |
| 8,587,420 B2* | 11/2013 | Koen | G07C 5/0808 340/438 |
| 8,624,727 B2 | 1/2014 | Saigh et al. | |
| 8,768,294 B2 | 7/2014 | Reitnour et al. | |
| 8,855,916 B2 | 10/2014 | Meredith et al. | |
| 9,147,335 B2 | 9/2015 | Rahunathan | |
| 9,372,090 B2 | 6/2016 | Tucker | |
| 9,424,515 B2 | 8/2016 | Atlas | |
| 9,631,933 B1 | 4/2017 | Aula | |
| 2002/0143587 A1 | 10/2002 | Champernown | |
| 2006/0235739 A1 | 10/2006 | Levis et al. | |
| 2007/0093247 A1 | 4/2007 | Yaqub | |
| 2007/0143013 A1* | 6/2007 | Breen | G01S 5/0027 701/32.3 |
| 2008/0114629 A1 | 5/2008 | Pavlov | |
| 2008/0125964 A1 | 5/2008 | Carani | |
| 2008/0195428 A1 | 8/2008 | O'Sullivan | |
| 2009/0006182 A1 | 1/2009 | Gammon | |
| 2009/0216600 A1* | 8/2009 | Hill | G06Q 10/06 705/7.14 |
| 2010/0017126 A1 | 1/2010 | Holcman | |
| 2010/0265052 A1* | 10/2010 | Koen | G07C 5/0808 340/438 |
| 2010/0280852 A1 | 11/2010 | Huang | |
| 2011/0112768 A1 | 5/2011 | Doyle | |
| 2011/0238300 A1* | 9/2011 | Schenken | B60W 40/09 701/408 |
| 2011/0307282 A1 | 12/2011 | Camp | |
| 2012/0041675 A1 | 2/2012 | Juliver et al. | |
| 2012/0046110 A1 | 2/2012 | Amaitis et al. | |
| 2012/0089326 A1* | 4/2012 | Bouve | G01C 21/00 701/411 |
| 2012/0200411 A1 | 8/2012 | Best | |
| 2012/0232943 A1 | 9/2012 | Myr | |
| 2012/0253892 A1* | 10/2012 | Davidson | G06Q 10/08 705/7.42 |
| 2012/0306659 A1* | 12/2012 | Ben-Dayan | G08B 21/0261 340/686.1 |
| 2013/0132140 A1 | 5/2013 | Amin | |
| 2013/0162425 A1 | 6/2013 | Raghunathan | |
| 2013/0290200 A1 | 10/2013 | Singhal | |
| 2013/0310053 A1 | 11/2013 | Srivastava et al. | |
| 2013/0332527 A1 | 12/2013 | Du | |
| 2014/0066090 A1 | 3/2014 | Henderson | |
| 2014/0087711 A1* | 3/2014 | Geyer | H04W 4/008 455/418 |
| 2014/0108201 A1 | 4/2014 | Frechett | |
| 2014/0156410 A1 | 6/2014 | Wuersch | |
| 2014/0172727 A1 | 6/2014 | Abhyanker | |
| 2014/0279707 A1* | 9/2014 | Joshua | G06Q 30/0283 705/400 |
| 2014/0365250 A1 | 12/2014 | Ikeda | |
| 2015/0031388 A1 | 1/2015 | Chatterjee et al. | |
| 2015/0032484 A1 | 1/2015 | Mermelstein | |
| 2015/0148060 A1 | 5/2015 | Parab et al. | |
| 2015/0161564 A1 | 6/2015 | Sweeney | |
| 2016/0014561 A1 | 1/2016 | Inzer | |
| 2016/0191637 A1 | 6/2016 | Memon | |
| 2016/0217669 A1 | 7/2016 | Benoit | |

FOREIGN PATENT DOCUMENTS

| | | |
|---|---|---|
| KR | 10-2011-0061568 | 6/2011 |
| WO | WO 2003/040972 | 5/2005 |
| WO | WO 2013-166216 | 11/2013 |

OTHER PUBLICATIONS

IPRP in PCT/US2016/019895 dated Sep. 8, 2017.
EESR in EP 15765578 dated Oct. 25, 2017.
EESR in EP 16824968.8 dated Jan. 30, 2019.

* cited by examiner

PERFORMING SELECTIVE OPERATIONS BASED ON MOBILE DEVICE LOCATIONS

RELATED APPLICATION

This application claims benefit of priority to U.S. Provisional Patent Application No. 62/121,212, filed Feb. 26, 2015, titled PERFORMING SELECTIVE OPERATIONS BASED ON MOBILE DEVICE LOCATIONS; the aforementioned application being incorporated by reference in its entirety.

BACKGROUND

A network service can provide a platform to enable users to request an on-demand service through use of computing devices. Service providers can also operate computing devices to communicate with the network service, and at times, to receive invitations to perform the on-demand services for requesting users. The network service can perform various operations to determine which service providers to assign to which requesting users based on location information received from the computing devices operated by both services providers and requesting users, respectively.

DETAILED DESCRIPTION

Figure 1:
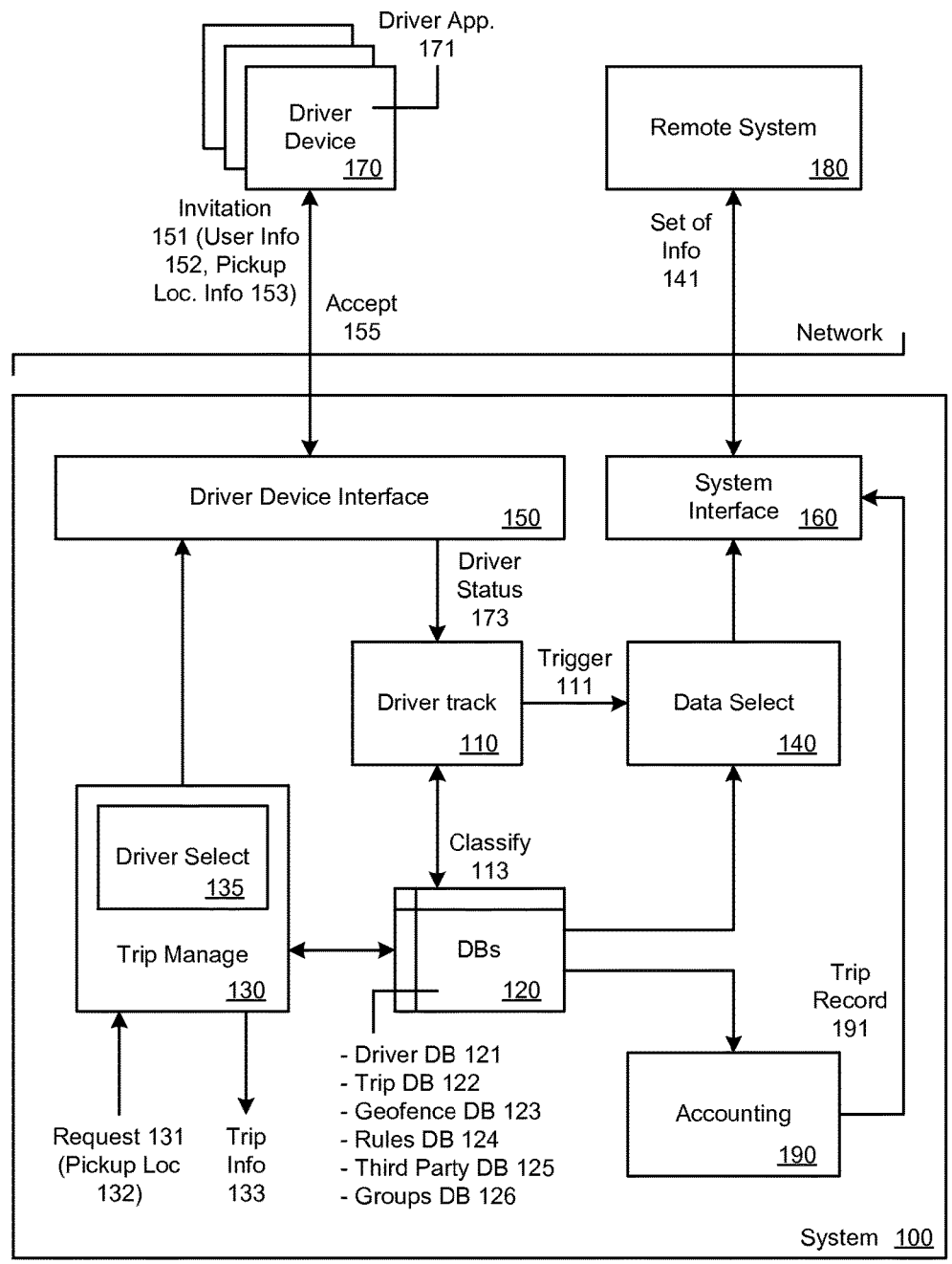
FIG. 1 illustrates an example system to perform location-based operations in connection with a transport service.

In examples described herein, a system can perform selective operations for a set of service providers based on the locations of the mobile computing devices operated by those service providers. The system can detect or track the locations of mobile computing devices operated by service providers to determine whether a location-based event has occurred with respect to any of the mobile computing devices. If a location-based event is detected in connection with a mobile computing device, the system can perform an operation(s) for the respective service provider that would otherwise not have been performed.

According to examples, the system described herein can be associated with, be in communication with, be a part of, or include a service arrangement system. A service arrangement system can arrange on-demand services to be provided by service providers for respective users through use of mobile computing devices. In one example, the system can periodically receive location data (and/or other data) from individual mobile computing devices operated by service providers. Based on the received location data, the system can determine when a first mobile computing device has entered a geographic region associated with a geofence. As described herein, a geofence can correspond to a geographic region and can be defined by a perimeter or at least three location data points. A location data point can correspond to an address, a landmark, or a geo-coordinate of a coordinate system, such as a latitude and a longitude. When the system determines that the first mobile computing device has entered the geographic region, the system can classify the respective service provider operating the first mobile computing device as being subject to a set of criteria different from the default criteria that the respective service provider would have otherwise been subject to when the first mobile computing device is not within the geographic region.

When the service provider is classified as being subject to the set of criteria, the system can perform operations for the service provider that are different from default operations associated with the default criteria. Still further, the system can continue to periodically receive location data from the mobile computing devices, and based on the received location data, the system can determine when the first mobile computing device has exited the geographic region. In response, the system can remove the classification of the service provider as being subject to the set of criteria. Once the classification is removed, the system can perform default operations, if necessary, for the service provider.

In some examples, when a service provider is subject to an alternate set of criteria different from the default criteria, the system can process or manage the service provider differently from other service providers that are not subject to the alternate set of criteria. For example, once the service provider enters a geographic region, the service provider can be grouped with other service providers in the geographic region. The system can perform an alternate selection process for those service providers in the group as compared to a default selection process. In another example, the system can transmit, to a remote computing system, data associated with the service provider that would otherwise not have been transmitted if the service provider was subject to the default criteria.

For example, the system can determine when a first mobile computing device has entered a geographic region based on received location data, and in response, determine a first set of information associated with a respective driver operating the first mobile computing device. As described herein, a driver can correspond to a service provider that is to provide transport or delivery services. The first set of information can include one or more of a vehicle identifier (ID) or a driver ID corresponding to the respective driver, and can also include at least one of (i) a current date, (ii) a time when the system determined that the first mobile computing device entered the geographic region, (iii) a location data point of the first mobile computing device when the first mobile computing device entered the geographic region, or (iv) an identifier corresponding to an entity associated with the system. In another example, the first set of information can include just an ID, or any combination of the listed information. Such information can be useful, for example, to satisfy safety or regulatory requirements, or financial or accounting requirements. The system can then transmit the first set of information to a remote computing system over one or more networks. According to one example, the remote computing system can be operated or controlled by a third-party entity that is different from the entity that operates or controls the system.

Still further, the system can subsequently determine, based on the received location data, when the first computing device has exited the geographic region. In response to detecting that the first computing device has exited the geographic region, the system can determine a second set of information associated with the respective driver. The second set of information can include the vehicle ID or driver ID, and can also include at least one of (i) the current date, (ii) a time when the system determined that the first mobile computing device exited the geographic region, (iii) a location data point of the first mobile computing device when the first mobile computing device exited the geographic region, or (iv) the identifier corresponding to the entity. Again, the system can transmit the second set of information to the remote computing system. In such examples, each time the system detects the occurrence of a location-based event (e.g., in this example, when a mobile computing device enters or exits a geographic region), the system can perform a selective operation(s) for the respective driver.

In other examples, rather than transmitting a set of information to the remote computing system each time a mobile computing device enters a geographic region, the system can record information for each occurrence in a database. In one example, the system can use a counter to keep track of the number of times individual drivers enter the geographic region in a given duration of time (e.g., a day, a week, a month, etc.). Similarly, the system can keep track of the number of times individual drivers exit the geographic region and/or the number of times individual drivers perform location-based actions in the geographic region (e.g., picks up riders or drops off riders). In another example, the system can store a set of information each time a location-based event occurs with respect to the geographic region in a given duration and transmit the sets of information to the remote computing system in bulk after the given duration.

As used herein, a client device, a driver device, a computing device, and/or a mobile computing device refer to devices corresponding to desktop computers, cellular devices or smartphones, personal digital assistants (PDAs), laptop computers, tablet devices, etc., that can provide network connectivity and processing resources for communicating with a system(s) over one or more networks, such as a service arrangement system. In one example, a driver device can also correspond to custom hardware of a vehicle, such as an in-vehicle computing device, that has network connectivity and location-determination capabilities.

Still further, examples described herein relate to a variety of location-based (and/or on-demand) services, such as a transport service, a food truck service, a delivery service, an entertainment service, etc. to be arranged between users and service providers. In other examples, a service arrangement system can be implemented by any entity that provides goods or services for purchase through the use of computing devices and network(s). For purpose of simplicity, in examples described herein, the service arrangement system can correspond to a transport arrangement system that arranges transport services to be provided for riders by drivers of vehicles.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system to perform location-based operations in connection with a transport service. In the example of FIG. 1, a system 100 can be in communication with or be a part of a service arrangement system, such as a transport arrangement system. The system 100 can include a number of components including a driver track 110, a plurality of databases 120, a trip manage 130, a data select 140, a driver device interface 150, and a system interface 160. The system 100 can include other components, such as a rider device interface to communicate with rider devices, but those components are not illustrated in FIG. 1 for purpose of simplicity. The components of the system 100 can combine to perform selective operations for select drivers based on location data provided by driver devices 170. Logic can be implemented with various applications (e.g., software) and/or with hardware of the computing device that implements the system 100.

In some examples, the system 100 can be implemented by, and operated on, a computing system(s) through execution of instructions stored in one or more memory resources of the computing system(s). The system 100 can be implemented on network side resources, such as on one or more servers or data centers, or implemented through other computer systems in alternative architectures (e.g., peer-to-peer networks, etc.). According to some examples, different components of the system 100 can be implemented on different computing systems that are in communication with each other. In the example of FIG. 1, the system 100 can include a driver device interface 150 to exchange data with a plurality of driver devices 170. Similarly, the system 100 can include a system interface 160 to exchange data with one or more remote systems 180. The driver device interface 150 and the system interface 160 can use one or more network resources of the computing system to exchange communications over one or more wireless networks (e.g., a cellular transceiver, a WLAN transceiver, etc.).

Each of the driver devices 170 can store and run a respective driver application 171 (a client-side application that can also be referred to herein as a designated service application) that can interface with the driver device interface 150. For example, the driver application 171 can include or use an application programming interface (API), such as an externally facing API, to communicate data with the system 100. The externally facing API can provide access to the system 100 via secure access channels over the network through any number of methods, such as web-based forms, programmatic access via restful APIs, Simple Object Access Protocol (SOAP), remote procedure call (RPC), scripting access, etc. Similarly, rider devices can also each run a client application (also referred to herein as a rider application) that can interface with a rider device interface to communicate with the system 100. A rider operating a rider device can view information about a transport service and make a request for a transport service using the client application.

As described herein, an individual driver (e.g., a service provider) can have an associated account with the system 100 in order to receive communications from the system 100 in connection with transport services. For example, when an individual driver wants to receive invitations to provide transport services from the system 100 (e.g., when the driver wants to be available to provide transport service using the platform provided by the service arrangement system), the driver can launch a respective driver application 171 on the driver's respective driver device 170 and/or sign in using credentials associated with the driver's account. The driver application 171 can operate in any one of a plurality of states, including, for example: (i) a signed-in state or off-duty state, e.g., after the driver logs in with his or her credentials, the driver has not yet indicated via user input on the driver application 171 that he or she is available to provide a transport service, or has indicated that he or she is no longer available to provide a transport service, (ii) an on-duty state, e.g., after the driver has indicated via user input on the driver application 171 that he or she is available to provide a transport service, (iii) an on-route state, e.g., the driver is to provide a transport service for a rider and is traveling to a specified pickup location of the rider, (iv) an on-trip state, e.g., the driver has picked up the rider and is providing the transport service (transporting the rider to a specified destination), or (v) a suspended state, e.g., the driver has hidden or placed the driver application 171 in a low-power or suspended state by selecting, for example, the home button of the driver device 170.

Depending on implementation, the driver application 171 can provide driver status information 173 to the system 100 once the driver application 171 is launched and/or based on the state that the driver application 171 is operating in. In one example, the driver application 171 can periodically transmit the driver status information 173 any time the driver application 171 is running on the driver device (and/or is not in a suspended state), while in another example, the driver application 171 can periodically transmit the driver status information 173 only when the driver is operating in a particular state(s), e.g., when the driver application 171 is operating in the on-duty state, the on-route state, and/or the on-trip state. Still further, in some examples, as an addition or an alternative, the driver application 171 can transmit the driver status information 173 when the driver application 171 changes states and/or in response to user input provided by the driver on the driver application 171.

According to examples, the driver status information 173 can include one or more of (i) a driver identifier (ID) associated with the driver, (ii) a device ID associated with the driver device 170, (iii) an application ID associated with the driver application 171, (iv) a state information corresponding to the state the driver application 171 is operating in, or (v) a location data point corresponding to the current location of the driver device 170 (e.g., a latitude and longitude coordinate), and/or an associated timestamp, a bearing, and/or an error value of that location data point. The location data point (and its associated timestamp, bearing, and/or error value) can be generated by a global positioning system (GPS) receiver of the driver device 170. In other examples, alternatively or additionally, the driver device can use one or more of other location determination mechanisms, such as Wi-Fi or cell tower triangulation or trilateration, to determine the location data point. The driver track 110 can receive the driver status information 173 from a plurality of driver devices 170 and can continuously update a driver database 121 with the information from the driver status information 173.

Although the system 100 can include multiple driver databases 121, for purpose of simplicity, the driver database 121 is described as a single database in FIG. 1. Similarly, each of the other databases 120 can represent one or more respective databases in the example of FIG. 1. The driver database 121 can store information about the driver accounts with the system 100 as well as the location and state information for each driver. For example, for each driver application 171 running on a respective driver device 170, the driver track 110 can store the most up-to-date or most recent location and state information of each respective driver in the driver database 121, and/or store previous locations and previous state information of each respective driver determined during a previous duration of time (e.g., the last day, the last week, or the last month).

In addition, the driver track 110 can determine, based on respective location and/or state information, whether a driver is currently located at a particular position or geographic region (and/or is in a particular state) that causes that driver to be subject to a set of alternate operational criteria (as opposed to default criteria). For example, the driver track 110 can access a geofence database 123, which stores information about a plurality of geofences. Each geofence entry stored in the geofence database 123 can include a geofence ID and a set of location information to define the geofence, and/or can be associated with one or more rules (or include one or more rule IDs). As described herein, a geofence can correspond to a geographic region or area and can be defined by a perimeter. A perimeter of a geofence can be defined in a variety of ways, e.g., using three or more location data points or can be defined using a radius value from a center location data point of the geofence (e.g., a circumference of a circular shaped geofence). The geofence entries may be configurable by a user, such as by an administrative user of the system 100 or by a third-party user of a third-party remote system 180.

For individual drivers that are operating the driver application 171, the driver track 110 can repeatedly perform a location check to determine whether any of the drivers have entered or exited a specified geographic region(s) or whether an event occurred while any of the drivers are in a specific geographic region(s). For example, for each driver operating a driver device 170, the driver track 110 can receive a location data point corresponding to the current location of that driver device 170 and check whether the location data point is positioned within any of the geofences from the geofence database 123. Because the driver device 170 periodically provides a location data point to the driver track 110 (e.g., even as the driver travels or changes positions), the driver track 110 can track the driver's movement, update the driver database 121, and periodically check whether the driver has entered or exited a geographic region associated with a geofence. In this manner, the driver track 110 can perform the location check for an individual driver each time the driver track 110 receives the location data point from the driver application 171 operated by that driver.

If the driver track 110 detects that a location-based event has occurred with respect to a particular geofence (e.g., a driver has entered or exited a geographic region associated with the geofence, or performed an action while positioned in a geographic region associated with the geofence), the driver track 110 can determine one or more rules associated with that geofence, and/or perform an operation(s) associated with the one or more rules. According to an example, rules that are associated with geofences can be stored in a rules or parameters database 124. One or more rules (also referred to herein as criteria or parameters) can specify what operation(s) or process(es) the system 100 is to perform for a particular driver or set of drivers. As an addition or an alternative, once the driver track 110 detects for a particular driver that a location-based event has occurred with respect to a particular geofence, the driver track 110 can determine a set of rules or criteria associated with that geofence, and classify the driver as being subject to the set of rules or criteria. The driver track 110 classifies 113 the driver as being subject to a set of criteria by flagging or marking an account associated with the driver or by adding the driver ID (and/or other associated identifier, such as a device ID) to a list or a group.

In some examples, a location-based event can depend on a particular state of the driver application 171. The driver track 110, for example, can use both the location information and state information of a driver to determine whether a location-based event has occurred. In one use case example, for a particular geofence, a driver can be classified 113 as being subject to a set of rules or criteria when the driver has entered a geographic region associated with that geofence and when the driver application 171 is also operating in a particular state(s) (e.g., is in an on-duty state or an on-trip state). In such an example, if the driver application 171 is in an off-duty state or suspended state, the driver track 110 may determine that no location-based event occurred even if the driver enters and exits a geographic region associated with that geofence.

As described herein, a set of criteria associated with a geofence can instruct the system 100 to manage a set of drivers (that are positioned within a geographic region of the geofence or have entered or exited the geographic region) differently than if the set of drivers was subject to default criteria (e.g., by classifying those drivers as being subject to the specified set of criteria and/or by performing one or more operations for those drivers). According to some examples, when drivers are subject to default criteria, the system 100 can operate default or normal operations in connection with transport services. As referred to herein, default operations can correspond to or include a default transport arrangement process for requesting riders and select drivers.

Referring to FIG. 1, the system 100 can include a transport service (or trip) manage 130 that can receive a request 131 for a transport service that was generated and transmitted by a rider device operated by a requesting rider. The request 131 can include information associated with the rider, and can include a specified pickup location 132, a destination location, and/or a vehicle type. The trip manage 130 can create a trip entry associated with the request 131 and store the trip entry (along with other trip entries) in the trip database 122. The trip manage 130 can also include a driver select 135 that performs a driver selection process in order to select a driver to provide the transport service for the rider. In some examples, in accordance with the default transport arrangement process, the driver select 135 can identify a set of available drivers (e.g., those that are capable of providing the transport service for the rider and/or are driving a vehicle of the specified vehicle type) based on the current location information of the drivers in the driver database 121, and select a driver from the set of available drivers. The driver select 135 can identify the set of available drivers by determining which drivers are within a predetermined radius of the pickup location 132 and can select the driver from the set based on certain criteria, e.g., by determining which driver is closest to the pickup location 132 and/or has the shortest estimated travel time away from the pickup location 132.

In addition, in accordance with the default transport arrangement process, once the driver is selected, the trip manage 130 can transmit an invitation 151 to the selected driver's driver device 170. The invitation 151 can include user information 152 (e.g., the user's name, rating, photo, etc.), the pickup location information 153 corresponding to the pickup location 132, and/or the destination location information, if any has been provided by the rider. If the driver accepts 155 the invitation 151, the trip manage 130 can receive indication of the acceptance, update the associated trip entry in the trip database 122, and can provide trip information 133 to the requesting rider device (e.g., the driver information, the estimated time of arrival, the location of the driver, etc.). The trip manage 130 can then track the performance of the transport service by monitoring the location of the driver and determining when the transport service is complete, and update the trip entry accordingly.

The trip manage 130 can also perform alternate operations (as compared to operations performed in connection with the default transport arrangement process) for one or more drivers that are classified as being subject to a set of criteria different from the default criteria. For example, a particular geofence can be associated with a set of rules/criteria that instructs the driver select 135 to manage those drivers that are located in the geographic region associated with that geofence differently than those that are not in the geographic region. In one example, the set of rules/criteria can cause the driver track 110 to flag or include the driver IDs of those drivers that are located in the geographic region in a list or group (such as a group stored in a groups database 126). An example of a group can correspond to a queue that the driver select 135 can use to perform a driver selection process. When a rider makes a request for a transport service with a pickup location in that geographic region, for example, the driver select 135 can determine the appropriate queue associated with that geofence and can select the driver that has been in the queue the longest (e.g., a first in, first out queue), as opposed to selecting the driver that is closest to or has the shortest estimated travel time to the pickup location. In this manner, the driver select 135 can perform alternate operations (or operate in a different mode than a default mode) for a set of drivers in accordance with the set of rules/criteria associated with the geofence, as compared to the default operations in connection with transport services.

In another example, a geofence can be associated with a set of rules/criteria that specifies which group or class of drivers, located in the geographic region of that geofence, can be selected to provide transport services for riders having pickup locations in that geographic region. If a driver that is not in the specified group or class of drivers enters the geographic region, for example, the driver track 110 can add a driver ID of that driver in a group (e.g., a do not select group). In such case, when the trip manage 130 receives a request 131 for transport, including a pickup location 132 in the given geographic region, the driver select 135 can perform a driver selection while excluding those drivers that are in the do not select group. Such an example can be useful for abiding by rules or regulations provided by different jurisdictions that cover different geographic regions (e.g., certain driver types can only operate in certain jurisdictions, or must have a certain state driver's licenses, etc.).

According to other examples, if the driver track 110 determines that a driver has entered a geographic region associated with a particular geofence, the associated rules/criteria can instruct the driver track 110 to cause a notification or an alert to be transmitted, e.g., to a computing device operated by an administrative user of the system 100. The notification or alert can include driver information and/or location information of the driver. Such examples can be useful for providing safety features or fraud prevention features to the administrators of the system 100 by notifying the administrators when a driver(s) enters an unsafe region or a region having a history of fraudulent behavior by either riders or drivers in the region.

Still further, in one example, the system 100 can perform additional alternative operations in conjunction with the default operations for or in connection with a set of drivers that are subject to an alternate set of criteria (as opposed to default criteria). A geofence can be associated with a set of criteria that causes the system 100 to transmit information to one or more remote systems 180. In such an example, the geofence can define a geographic region that corresponds to or includes an airport and its surrounding areas. For example, an entity that operates the system 100 may have entered into an agreement with an airport entity that manages or operates the airport, such that the system 100 provides driver information to a remote system 180 operated by the airport entity. The driver information can inform the airport entity when drivers enter or exit the geographic region for purpose of providing transport services in connection with the airport (e.g., pick up or drop off riders at the airport) over a duration of time. Such driver information can be used by the airport entity for determining ingress and egress points, for accounting purposes, for safety purposes (e.g., be aware of who is in the geographic region of the airport), and/or for determining statistics associated with the airport.

Referring back to FIG. 1, the driver track 110 can determine when location-based events occur with respect to the geographic region of the geofence, such as when drivers enter or exit the geographic region or when drivers perform some action within the geographic region. According to this example, when the driver track 110 determines that a driver has entered the geographic region associated with the geofence (e.g., crossed a boundary or perimeter of the geofence), based on the location data provided by the driver device 170, the driver track 110 can determine a set of rules associated with that geofence. The set of rules can specify what driver information is to be determined or retrieved from the driver database 121 and where to transmit the driver information. In one example, the set of rules can specify an entity or third party ID associated with the geofence, and the driver track 110 can determine, from the third party database 125, information associated with the third party ID, including the name of the third party, the associated geofence ID, and/or the address, port, or socket of the third party remote system 180 that the driver information is to be transmitted to, as well as what driver information is to be transmitted to the remote system 180 of the third party entity. The driver track 110 can transmit a trigger 111 that instructs the data select 140 to determine, from the driver database 121, the appropriate driver information and transmit the driver information to the appropriate remote system 180 in accordance with the information associated with the third party ID.

According to one example, the data select 140 can access the driver database 121 to determine a set of driver information in accordance with the rules/criteria associated with the geofence. Depending on implementation, the data select 140 can determine a first set of information associated with the driver that entered the geographic region, including one or more of a vehicle ID (e.g., vehicle identification number, vehicle type information, a photograph of the vehicle, and/or vehicle license plate number, etc.), a driver ID corresponding to the respective driver (e.g., a name, a photograph of the driver, a unique ID or username of the driver, a unique ID for the driver's device, and/or driver's license information, etc.), the current date, the time when the system 100 determined that the driver's driver device 170 entered the geographic region, a location data point of the driver device 170 when the driver device 170 entered the geographic region, or the associated third party entity information. The data select 140 can then transmit, via the system interface 160, the first set of information 141 to the remote system 180 using the address, port, or socket of the remote system 180.

Subsequently, the driver track 110 can determine whether other location-based events have occurred with respect to the driver in/at the geographic region, such as whether the driver has received an invitation for transport service while in the geographic region and/or accepted the invitation, completed a transport service in the geographic region, and/or has exited the geographic region. For example, if the driver track 110 detects that the driver has exited the geographic region, the driver track 110 can again transmit a trigger 111 to cause the data select 140 to determine and transmit a second set of driver information in accordance with the rules/criteria associated with the geofence. The second set of driver information can be similar to the first set, and can include, for example, one or more of the vehicle ID, the driver ID, the current date, the time when the system 100 determined that the driver's driver device 170 exited the geographic region, a location data point of the driver device 170 when the driver device 170 exited the geographic region, or the associated third party entity information.

Similarly, in another example, if the driver track 110 detects that the driver has received an invitation for a transport service or accepted the invitation while the driver is in the geographic region, the driver track 110 can also transmit a trigger 111 to cause the data select 140 to determine and transmit another set of driver information associated with this location-based event to the remote system 180. This set of driver information can include one or more of the vehicle ID, the driver ID, the current date, the time when the system 100 determined that the driver's driver device 170 received or accepted the invitation, a location data point of the driver device 170 when the driver device 170 received or accepted the invitation, or the associated third party entity information. Still further, if the driver track 110 detects that the driver has dropped off or completed a transport service in the geographic region, the driver track 110 can transmit a trigger 111 to cause the data select 140 to determine and transmit another set of driver information associated with this location-based event to the remote system, such as one or more of the vehicle ID, the driver ID, the current date, the time when the system 100 determined that the driver's driver device 170 indicated completion of the transport service, a location data point of the driver device 170 when the driver device 170 completed the transport service, or the associated third party entity information. In this manner, sets of driver information can be transmitted to the third party remote system 180 at various instances of time, triggered by location-based events associated with the geofence (e.g., when the driver enters or exits the geographic region, or performs an action in the geographic region).

As an addition or an alternative, rather than transmitting a set of driver information 141 in response to detecting a location-based event, each time a location-based event occurs with respect to a particular geofence, the system 100 can keep track of each instance in a given duration of time (e.g., increment a counter) and/or can store a set of information associated with that event, such as the set of driver information described, in a memory resource (e.g., a local memory resource or one that is accessible by the system 100 over one or more networks). The system 100 can use the stored information for a variety of purposes, such as for accounting, for internal auditing, for safety/regulatory purposes (e.g., to have a detailed record of where drivers are operating), or for traffic or location studies (e.g., determine traffic behavior in a region).

For example, the system 100 can keep track of how many times, in a given duration (e.g., in a week or a month), drivers on its platform have picked up or dropped off a rider in a geographic region, e.g., such as at a region that includes an airport, and store such information in a database of the plurality of database 120. A geofence can be associated with the airport and can cover a geographic region that includes the airport and its surrounding areas. An accounting component 190 of the system 100 can access the database in order to generate a record(s) 191 for use with any of the variety of purposes. In one example, the accounting component 190 can access the database to generate and provide a record(s) 191 to an entity associated with that geographic region/geofence (e.g., an airport entity). For example, the record 191 can indicate the number of times drivers have entered and/or exited the airport for purpose of providing transport services, and/or picked up or dropped off riders at the airport in a given duration (e.g., a month) for purpose of paying a total fee for the amount of transport services taking place at the airport. In other examples, the record 191 can also include detailed sets of information associated with each of the occurrences.

The accounting component 190 can generate the record 191 based on a predetermined schedule, periodically (e.g., at the end of every week or month), or in response to administrative user input. For example, for a given duration, the accounting component 190 can use the information associated with the geofence (e.g., the number of times drivers have entered and/or exited the airport for purpose of providing transport services, and/or picked up or dropped off riders at the airport) to calculate the amount of fees owed to the airport entity. The record(s) 191 can be provided to the entity via the system interface 160 or via another portal or other communication mechanism, such as via an e-mail communication or a webpage content, using the respective entity information (e.g., from the third party database 125).

In another example, in response to detecting a location-based event with respect to a geofence, the system 100 can transmit a data item to the remote system 180 to indicate the occurrence of an event. Each time the remote system 180 receives the data item, the remote system 180 can increment a counter(s) to keep track of the total number of location-based event occurrences that have occurred (e.g., in a duration of time). The data item can be indicative of the respective location-based event.

For example, a third party entity that operates the remote system 180, such as the airport entity, may want to perform an accounting and charge a fee (either charge the drivers or the entity that implements the system 100) in relation to transport services at the airport. By providing a data item each time a location-based event occurs with respect to that geofence, the remote system 180 can keep a record and determine a fee based on the number of instances that drivers entered and/or exited the airport for purpose of providing transport services, and/or picked up or dropped off riders at the airport. Alternatively, the remote system 180 can determine a fee for each respective instance. The remote system 180 can charge the total fee at scheduled times or periodically (e.g., every week or every month, etc.) and can reset the counter(s), for example, each time thereafter. In such an example, the remote system 180 can include a similar accounting component, such as the accounting component 190 of the system 100. The remote system 180 can determine the amount of fees that is to be owed, generate a record of location-based event occurrences that occurred in a given duration of time, and transmit the record to the entity operating the system 100.

Methodology

Figure 2:
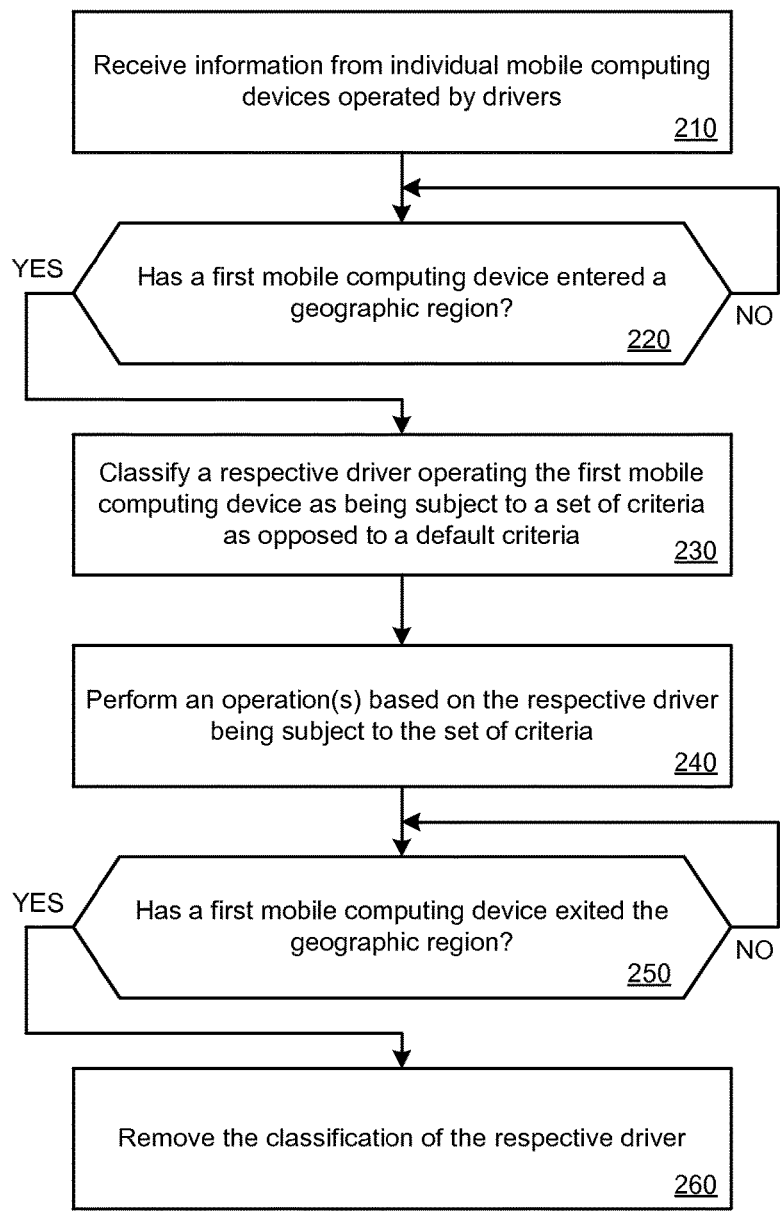
FIG. 2 illustrates an example method for performing location-based operations in connection with a transport service.

FIG. 2 illustrates an example method for performing location-based operations in connection with a transport service. A method such as described by an example of FIG. 2 can be implemented using, for example, components described with an example of FIG. 1. Accordingly, references made to elements of FIG. 1 are for purposes of illustrating a suitable element or component for performing a step or sub-step being described.

Referring to FIG. 2, the system 100 can receive information from individual driver devices operated by drivers (210). Each driver can operate a driver application 171 on the respective driver device 170 that periodically transmit status information to the system 100. The status information 173 can include driver information, state information of the driver/driver application, and/or location information corresponding to the current location of the respective driver device 170. The system 100 can continuously store and update the driver database 121 with the information received from the driver devices 170.

The system 100 can also determine, based on the location information received from the driver devices, whether any of the driver devices has entered a geographic region associated with a geofence (220). According to some examples, the driver track 110 can perform a location check of each location data point received from a driver device to determine whether that location data point is positioned within any geographic regions specified by geofences in the geofence database 123. If no drivers have entered any specified geographic regions, the driver track 110 can continue to receive status information 173 and perform location checks. On the other hand, if the driver track determines that a driver (e.g., a first driver in this example) has entered a particular geographic region, the driver track 110 can classify the first driver as being subject to a first set of criteria associated with the geofence (as compared to default criteria that the first driver would have been subject to if the first driver was outside the geographic region or in another region) (230). The first set of criteria can specify how the system 100 is to handle the first driver (as well as other drivers that are also classified as being subject to the first set of criteria) and/or what operations or processes to perform for the first driver that are different from default operations.

In one example, the driver track 110 can classify the first driver as being subject to a first set of criteria by flagging or marking the first driver's driver account or by adding the driver ID of the first driver to a list or a group (or a queue). The system 100 can also perform one or more operations in connection with the first driver based on the first driver being classified as being subject to the first set of criteria (240). In some variations, the system 100 may not perform any operations for the first driver if no operations are necessary. For example, the first driver may have entered the geographic region, but then provided input on the driver application 171 to go off-duty or close/turn off the driver application 171, or may have exited the geographic region before the first driver was subject to any driver selection process by the system 100. As described herein, the system 100 can perform one or more operations based on the first driver being subject to the first set of criteria, such as transmitting sets of data to a remote system in response to detecting that the first driver entered the geographic region and/or in response to classifying the first driver as being subject to the first set of criteria.

The system 100 can also detect, based on the location information received from the driver devices, whether the first driver has exited the geographic region (250). For example, as the driver travels or changes position and the driver device 170 provides status information 173, the driver track 110 can continue to check whether the driver has exited the geographic region. If the driver has not exited the geographic region, the system 100 can continue to perform one or more operations, as necessary, specified by the first set of criteria. On the other hand, if the driver track 110 determines that the first driver has exited the geographic region, the driver track 110 can remove the existing classification of the first driver to enable the first driver to no longer be subject to the first set of criteria (and instead, be subject to the default criteria) (260). According to some examples, the system 100 can also, concurrently, perform one or more operations with removing the existing classification (e.g., transmit a set of data, remove the driver ID from the list or group, trigger an alert to be transmitted by the system 100, etc.).

Figure 3A:
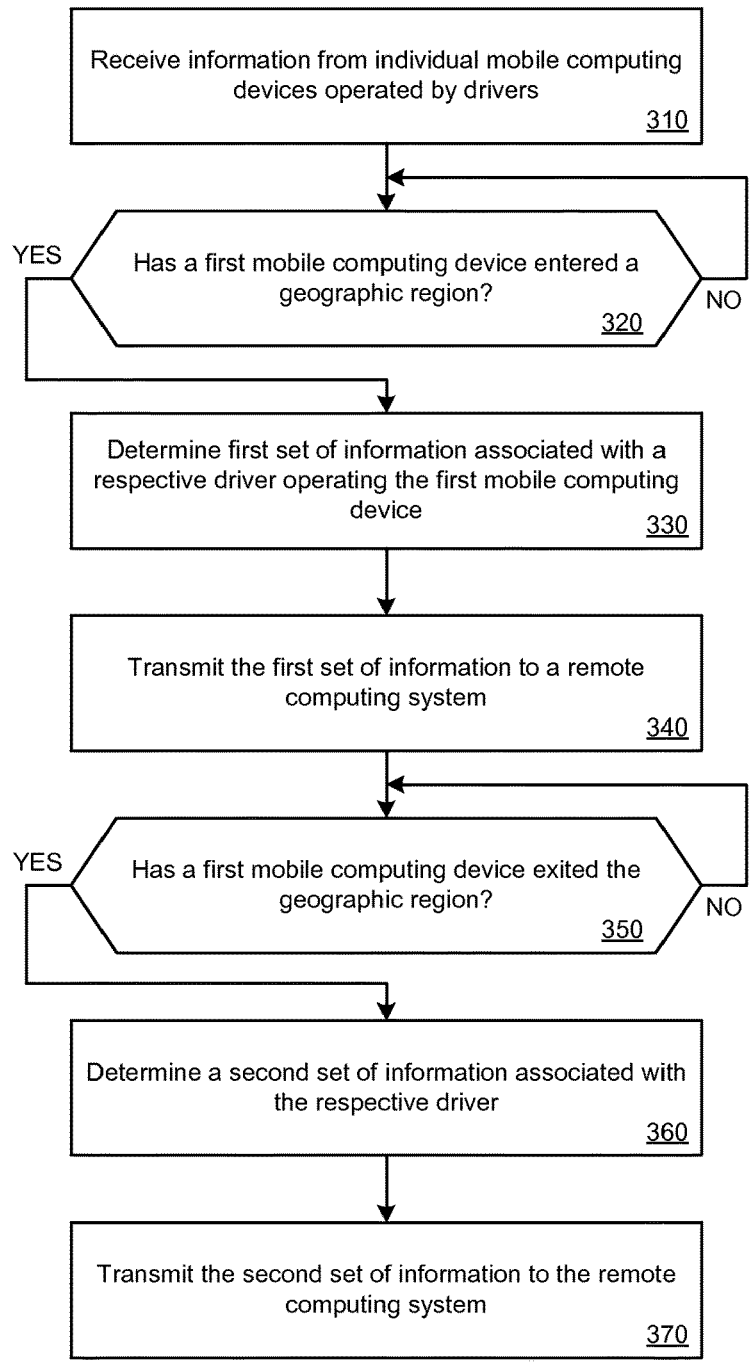
FIGS. 3A and 3B illustrate other example methods for performing location-based operations in connection with a transport service.
Figure 3B:
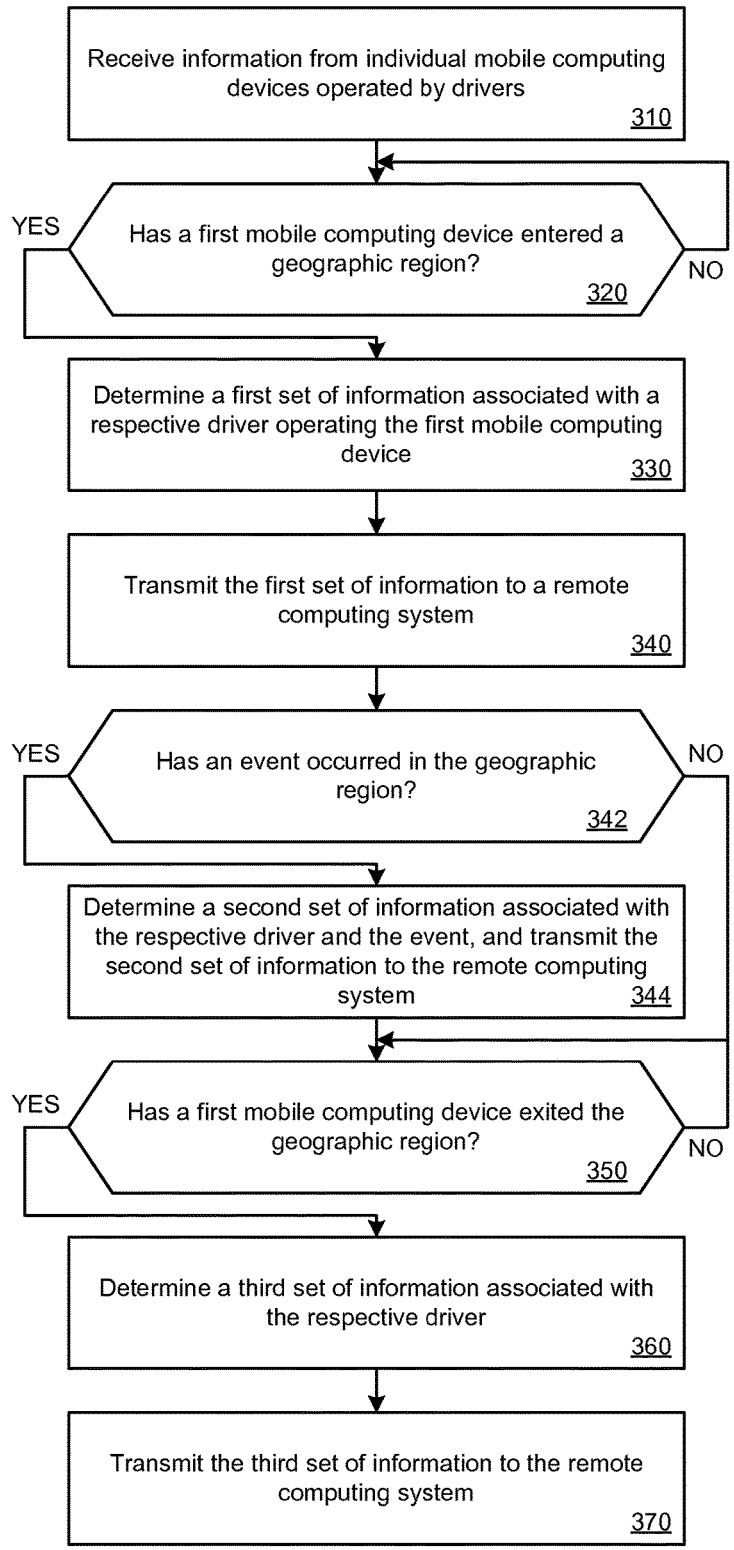

FIGS. 3A and 3B illustrate other example methods for performing location-based operations in connection with a transport service. FIGS. 3A and 3B can illustrate a particular use case example of the method described in FIG. 2. Methods such as described by examples of FIGS. 3A and 3B can be implemented using, for example, components described with an example of FIG. 1. Accordingly, references made to elements of FIG. 1 are for purposes of illustrating a suitable element or component for performing a step or sub-step being described.

Referring to FIG. 3A, the system 100 can receive status information, including location information, from individual driver devices operated by drivers, such as described in step 210 of FIG. 2 (310). Based on the location information, the system 100 can determine whether any driver devices have entered a geographic region specified by a geofence (320). If not, the system 100 can continue to receive status information from driver devices and continuously perform a location check for individual driver devices.

On the other hand, if the driver track 110 determines that a first driver device operated by a first driver has entered a geographic region specified by a particular geofence, the system 100 can determine a first set of information associated with the first driver (330). According to one or more examples, the driver track 110 can identify one or more rules/criteria associated with the geofence, which can instruct the system 100 to perform a specified set of operations in connection with the first driver (e.g., transmit data to a third party system). The driver track 110 can identify from a third party database 125, for example, information of a third party entity that is associated with the one or more rules/criteria and/or the geofence. The information of the third party entity can specify what set of driver information is to be retrieved from the driver database 121 and where to transmit the set of driver information. In one example, the driver track 110 can cause the data select 140 to retrieve the appropriate set of driver information associated with the first driver from the driver database 121.

In one example, the first set of driver information can include at least one or more of a vehicle ID, a driver ID corresponding to the first driver, the current date, the time when the system 100 determined that the first driver's driver device entered the geographic region, a location data point of the driver device when the driver device entered the geographic region, or the associated third party entity information. The data select 140 can then transmit the first set of driver information to the remote system 180 operated by the third party entity (340), e.g., using the associated third party entity information. Subsequently, the driver track 110 can continue to monitor the driver device and determine, based on the location information received from the driver device, whether the first driver device has exited the geographic region (350). If not, the driver track 110 continues to monitor the driver device and perform location checks.

On the other hand, if the driver has exited the geographic region, the driver track 110 can cause the data select 140 to determine a second set of driver information associated with the first driver (e.g., by retrieving the driver information from the driver database 121) (360). The second set of driver information can include at least one or more of the vehicle ID, the driver ID, the current date, the time when the system 100 determined that the first driver's driver device exited the geographic region, a location data point of the driver device when the driver device exited the geographic region, or the associated third party entity information. The data select 140 can transmit the second set of information to the remote system 180. In this manner, in some examples, when location-based events occur with respect to a particular geographic region, the system 100 can perform operations apart from or in addition to the default operations performed by the system in connection with transport services.

The example method of FIG. 3B is similar to the method described in FIG. 3A, except the system 100 can also perform additional operations for the first driver, if necessary, when the first driver is located in the geographic region. For example, FIG. 3B illustrates an additional instance of the system 100 detecting a location-based event in connection with the geographic region.

For example, the first driver can enter the geographic region, such as a geographic region associated with an airport and its surrounding areas, in order to (i) pass through while traveling, in general, (ii) potentially receive an invitation to perform a transport service for a requesting rider, and/or (iii) drop off a rider that the driver is currently driving, for example, at the airport. After the driver track 110 detects that the first driver entered the geographic region (and after the system 100 has transmitted the first set of driver information (340), the driver track 110 can also determine when an event has occurred in the geographic region (342). If no event has occurred in the geographic region, the system continues to monitor the first driver's device to determine whether the first driver has exited the geographic region, such as described in FIG. 3A (350). Alternatively, if the driver track 110 detects that an event has occurred with respect to the first driver, the driver track 110 can cause the data select to determine a second set of information associated with the first driver and transmit the second set of information to the remote system (344).

Such an event, for example, can correspond to any one of the driver application receiving an invitation, the driver accepting the invitation, the driver indicating that a requesting rider has been picked up (e.g., and the driver is now in the on-trip state), the driver indicating that a transport service is being completed and has dropped off the rider. According to an example, the driver track 110 can detect whether an event has occurred from status information received from the first driver's device (e.g., indicating that the first driver has accepted an invitation, has started the transport service, or has completed a transport service) and/or from information provided from the trip manage 130, which transmits the invitation to the driver device and/or receives an acceptance from the driver device.

Referring back to step 244, the data select 140 can determine a set of information associated with the detected event. For example, the set of information can include one or more of a vehicle ID, a driver ID corresponding to the first driver, the current date, the time when the system 100 determined that the event occurred in the geographic region, a location data point of the driver device when the event occurred in the geographic region, or the associated third party entity information. According to some examples, the system 100 can continue to detect whether one or more other events have occurred in the geographic region, and can determine and transmit a set of driver information each time the event is detected, until the system 100 determines that the first driver has exited the geographic region (and performs the remaining steps of FIG. 3B).

Hardware Diagrams

Figure 4:
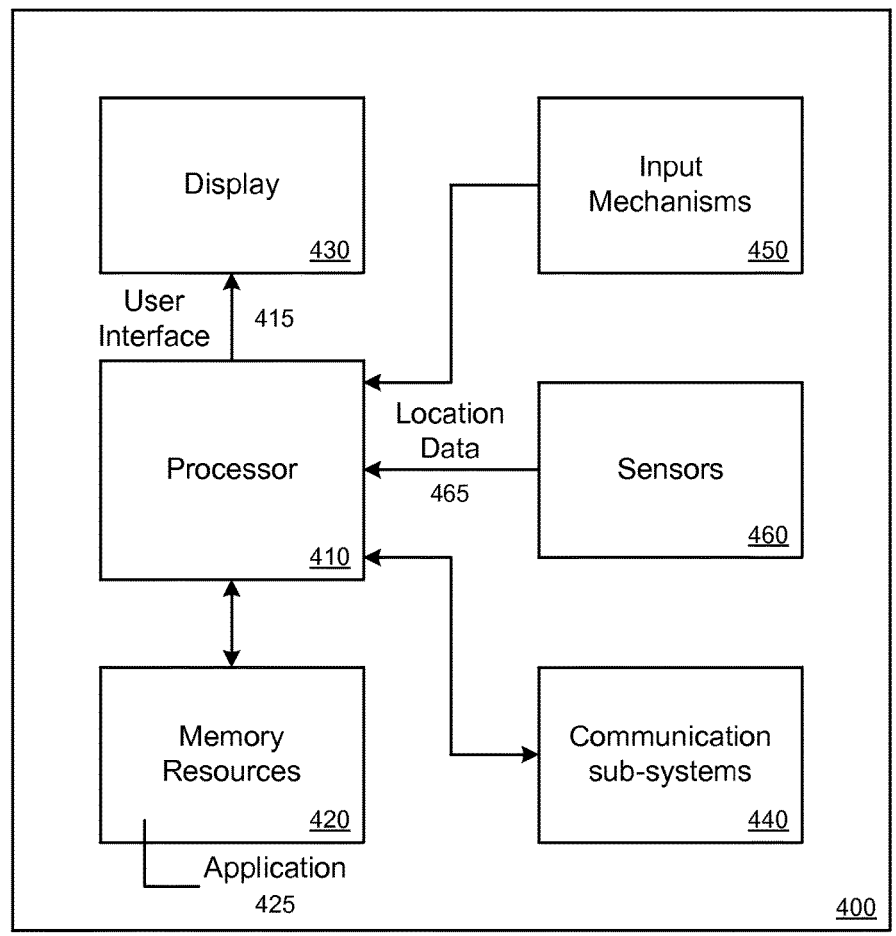
FIG. 4 is a block diagram that illustrates a mobile computing device upon which embodiments described herein may be implemented.

FIG. 4 is a block diagram that illustrates a mobile computing device upon which embodiments described herein may be implemented. In one example, a computing device 400 may correspond to a mobile computing device, such as a cellular device that is capable of telephony, messaging, and data services. The computing device 400 can correspond to a rider device or a driver device. Examples of such devices include smartphones, handsets or tablet devices for cellular carriers. The computing device 400 includes a processor 410, memory resources 420, a display device 430 (e.g., such as a touch-sensitive display device), one or more communication sub-systems 440 (including wireless communication sub-systems), input mechanisms 450 (e.g., an input mechanism can include or be part of the touch-sensitive display device), and one or more sensors 460, including a location detection mechanism (e.g., GPS receiver). In one example, at least one of the communication sub-systems 440 sends and receives cellular data over data channels and voice channels. The communications sub-systems 440 can include a cellular transceiver and one or more short-range wireless transceivers.

The processor 410 can provide a variety of content to be displayed on the display 430 by executing instructions stored in the memory resources 420. The memory resources 420 can store instructions corresponding to the driver application 425, for example, and other data, such as data associated with the driver application 425 (e.g., trip entry data, driver information, driver credentials, etc.). For example, the processor 410 is configured with software and/or other logic to perform one or more processes, steps, and other functions described with implementations, such as described by FIGS. 1 through 3B, and elsewhere in the application. In particular, the processor 410 can execute instructions and data corresponding to the driver application 425 in order to periodically receive or retrieve location data 465 corresponding to the current location of the computing device 400 and providing status information of the driver/driver application 425 to the service arrangement system (e.g., the system 100 of FIG. 1). The processor 410 can also execute the driver application instructions 425 to cause various user interfaces 415 to be displayed on the display 430. The user interfaces 415 can correspond to user interfaces that are displayed in connection with the transport service, including an invitation user interface when an invitation is received form the system 100, and other user interfaces corresponding to respective driver application states. The user interfaces 415 can also include selectable features to enable the driver to provide input via the input mechanisms 450 to indicate changes in the driver application state.

In one example, the computing device 400 can periodically determine a location data point 465 of the current location of the computing device 400 from the GPS receiver. In another example, the computing device 400 can determine the current location by using one or more transceivers or a GPS receiver of the communications sub-systems 440. While FIG. 4 is illustrated for a mobile computing device, one or more examples may be implemented on other types of devices, including full-functional computers, such as laptops and desktops (e.g., PC).

Figure 5:
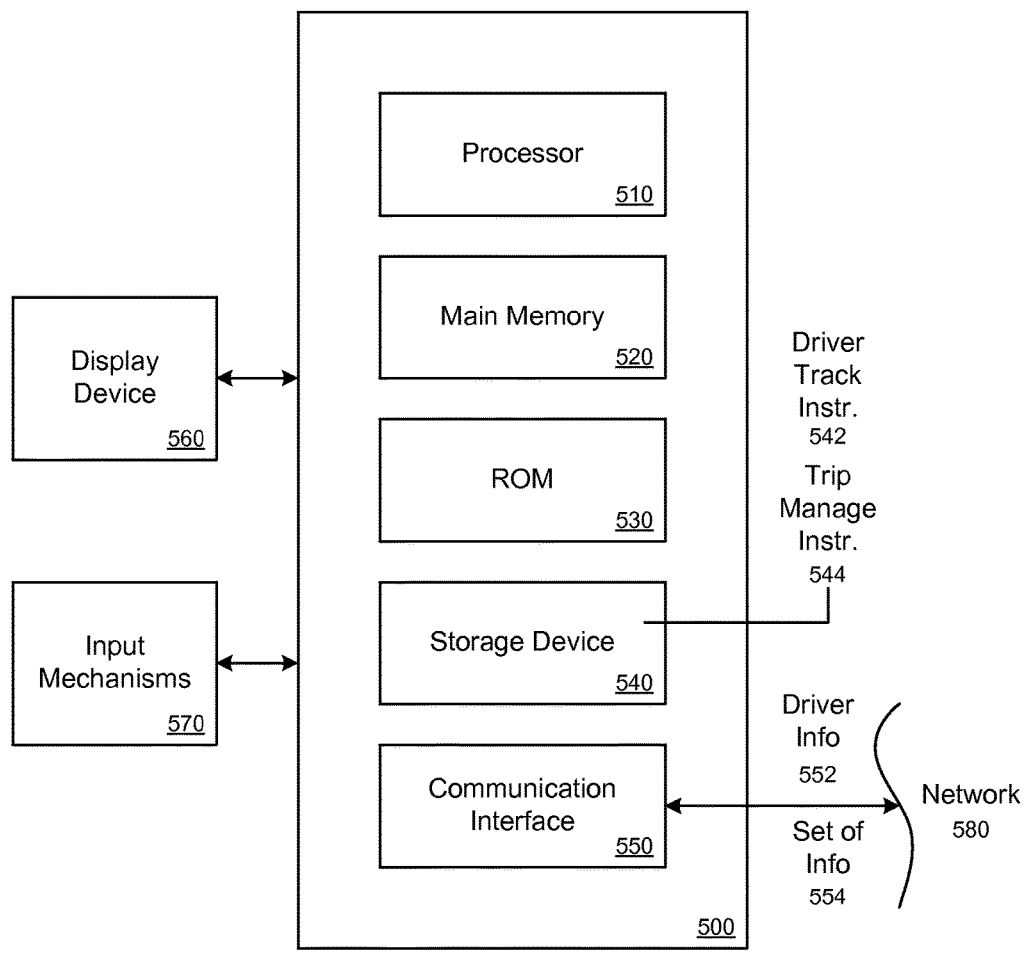
FIG. 5 is a block diagram that illustrates a computer system upon which examples described herein may be implemented.

FIG. 5 is a block diagram that illustrates a computer system upon which examples described herein may be implemented. For example, in the context of FIG. 1, the service arrangement system (e.g., the system 100) may be implemented using a computer system such as described by FIG. 5. The service arrangement system may also be implemented using a combination of multiple computer systems as described by FIG. 5.

In one implementation, the computer system 500 includes processing resources, such as one or more processors 510, a main memory 520, a read-only memory (ROM) 530, a storage device 540, and a communication interface 550. The computer system 500 includes at least one processor 510 for processing information and the main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. The storage device 540, such as a magnetic disk or optical disk, is provided for storing information and instructions.

For example, the storage device 540 can correspond to a computer-readable medium that stores driver track instructions 542 and trip manage instructions 544 for performing operations discussed with respect to FIGS. 1 through 3B. In such examples, the computer system 500 can receive location data from a plurality of driver devices, determine which drivers have triggered a location-based event with respect to a geographic region specified by a geofence, and perform alternate operations (as opposed to default operations) for or in connection with those drivers. In addition, the storage device 540 can store other instructions, such as instructions to implement the data select component of FIG. 1, and other data, such as data stored in the plurality of databases 120 of FIG. 1.

The communication interface 550 can enable the computer system 500 to communicate with one or more networks 580 (e.g., cellular network) through use of the network link (wirelessly or using a wire). Using the network link, the computer system 500 can communicate with a plurality of devices, such as the mobile computing devices of the riders and drivers. According to some examples, the computer system 500 can receive driver status information 552 from the driver devices, such as described by some examples of FIGS. 1 through 3B. When certain location-based events occur with respect to a geographic region, the computer system 500 can transmit a set of driver information 554 to a third party operated remote system, such as described by examples of FIGS. 1 through 3B.

The computer system 500 can also include a display device 560, such as a cathode ray tube (CRT), an LCD monitor, or a television set, for example, for displaying graphics and information to a user. An input mechanism 570, such as a keyboard that includes alphanumeric keys and other keys, can be coupled to the computer system 500 for communicating information and command selections to the processor 510. Other non-limiting, illustrative examples of the input mechanisms 570 include a mouse, a trackball, touch-sensitive screen, or cursor direction keys for communicating direction information and command selections to the processor 510 and for controlling cursor movement on the display 560.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method for operating a computer system to arrange transport services, the method comprising:

communicating, over a network by the computer system, with a plurality of mobile computing devices that are each associated with a corresponding driver of a plurality of drivers providing transport services, each of the plurality of mobile computing devices executing a service application to programmatically interface and communicate with the computer system;

wherein communicating over the network includes continuously tracking, by the computer system in real-time, (i) a most recent location of each of the plurality of mobile computing devices, and (ii) an operational state of the service application executing on each of the plurality of mobile computing devices, the operational state being one of multiple possible operational states, including a first operational state that indicates whether the corresponding driver is available to provide transport and a second operational state that indicates whether the corresponding driver is assigned to provide transport, wherein the respective locations of the plurality of mobile computing devices are tracked by monitoring data from one or more location detection sensors of the plurality of mobile computing devices;

for each driver of the plurality of drivers, making a determination, by the computer system, to subject the driver to one of multiple sets of rules, including a default set of rules and an alternative set of rules that are associated with a geofenced area, wherein for each driver, the computer system makes the determination based at least in part on the most recent location of the mobile computing device of the driver relative to the geofenced area, and the operational state of the service application executing on the mobile computing device of the driver;

for each of the plurality of drivers that is subject to the alternative set of rules, adding, by the computer system, an identifier of the driver to a queue in which multiple drivers are identified by respective identifiers in an order that reflects a relative time when the identifier of the driver was added to the queue;

over a given duration, arranging, by the computer system, a respective transport service for each of a plurality of requests;

wherein for a first request of the plurality of requests in which a respective pickup location is within the geofenced area, the computer system arranges the respective transport service by (i) selecting one of the plurality of drivers that is subject to the alternative set of rules, based on the order of the respective identifiers of the queue and not on a proximity of individual drivers of the plurality of drivers to the respective pickup location of the first request, (ii) communicating the respective pickup location of the first request to the mobile computing device of the selected driver, and (iii) monitoring the selected driver in providing the respective transport service for the first request;

wherein for a second request of the plurality of requests in which a respective pickup location is outside of the geofenced area, the computer system arranges the respective transport service by (i) selecting one of the plurality of drivers that is subject to the default set of rules, based at least in part on a proximity of the selected driver to the respective pickup location of the second request, (ii) communicating the respective pickup location of the second request to the mobile computing device of the selected driver, and (iii) monitoring the selected driver in providing the respective transport service for the second request.

2. The method of claim 1, further comprising generating a record to count a number of times each of the plurality of drivers enter the geofenced area.

3. The method of claim 1, further comprising generating a record to count a number of pickups and drop-offs performed by each of the plurality of drivers within the geofenced area in the given duration.

4. The method of claim 1, further comprising:
determining the alternative set of rules by accessing a database that stores information about the geofenced area, the information including an identifier of an entity associated with the geofenced area.

5. The method of claim 1, wherein making the determination is based at least in part on a period of time in which the driver is located within the geofenced area.

6. A non-transitory computer-readable medium storing instructions that, when executed by one or more processors of a computer system, cause the computer system to:
communicate, over a network by the computer system, with a plurality of mobile computing devices that are each associated with a corresponding driver of a plurality of drivers providing transport services, each of the plurality of mobile computing devices executing a service application to programmatically interface and communicate with the computer system;
wherein communicating over the network includes continuously tracking, by the computer system in real-time, (i) a most recent location of each of the plurality of mobile computing devices, and (ii) an operational state of the service application executing on each of the plurality of mobile computing devices, the operational state being one of multiple possible operational states, including a first operational state that indicates whether the corresponding driver is available to provide transport and a second operational state that indicates whether the corresponding driver is assigned to provide transport, wherein the respective locations of the plurality of mobile computing devices are tracked by monitoring data from one or more location detection sensors;
for each driver of the plurality of drivers, make a determination, by the computer system, to subject the driver to one of multiple sets of rules, including a default set of rules and an alternative set of rules that are associated with a geofenced area, wherein for each driver, the computer system makes the determination based at least in part on the most recent location of the mobile computing device of the driver relative to the geofenced area, and the operational state of the service application executing on the mobile computing device of the driver;
for each of the plurality of drivers that is subject to the alternative set of rules, add, by the computer system, an identifier of the driver to a queue in which multiple drivers are identified by respective identifiers in an order that reflects a relative time when the identifier of the driver was added to the queue;
over a given duration, arrange, by the computer system, a respective transport service for each of a plurality of requests;
wherein for a first request of the plurality of requests in which a respective pickup location is within the geofenced area, the computer system arranges the respective transport service by (i) selecting one of the plurality of drivers that is subject to the alternative set of rules, based on the order of the respective identifiers of the queue and not on a proximity of individual drivers of the plurality of drivers to the respective pickup location of the first request, (ii) communicating the respective pickup location of the first request to the mobile computing device of the selected driver, and (iii) monitoring the selected driver in providing the respective transport service for the first request;
wherein for a second request of the plurality of requests in which a respective pickup location is outside of the geofenced area, the computer system arranges the respective transport service by (i) selecting one of the plurality of drivers that is subject to the default set of rules based at least in part on a proximity of the selected driver to the respective pickup location of the second request, (ii) communicating the respective pickup location to the mobile computing device of the selected driver, and (iii) monitoring the selected driver in providing the respective transport service for the second request.

7. The non-transitory computer-readable medium of claim 6, further comprising instructions, which when executed by the computer system, cause the computer system to:
generate a record to count a number of times each of the plurality of drivers enter the geofenced area.

8. The non-transitory computer-readable medium of claim 6, further comprising instructions, which when executed by the computer system, cause the computer system to:
generate a record to count a number of pickups and drop-offs performed by each of the plurality of drivers within the geofenced area for providing transport services in the given duration.

9. The non-transitory computer-readable medium of claim 6, further comprising instructions, which when executed by the computer system, cause the computer system to:
determine the alternative set of rules by accessing a database that stores information about the geofenced area, the information including an identifier of an entity associated with the geofenced area.

10. The non-transitory computer-readable medium of claim 6, wherein making the determination is based at least in part on a period of time during which the driver is located within the geofenced area.

11. A service arrangement system comprising:
a memory to store a set of instructions;
one or more processors that use the set of instructions to:
communicate, over a network, with a plurality of mobile computing devices that are each associated with a corresponding driver of a plurality of drivers providing transport services, each of the plurality of mobile computing devices executing a service application to programmatically interface and communicate with the service arrangement system;
wherein the one or more processors communicate over the network by continuously tracking, in real-time, (i) a most recent location of each of the plurality of mobile computing devices, and (ii) an operational state of the service application executing on each of the plurality of mobile computing devices, the operational state being one of multiple possible operational states, including a first operational state that indicates whether the corresponding driver is available to provide transport and a second operational state that indicates whether the corresponding driver is assigned to provide transport, wherein the respective locations of the plurality of mobile computing devices are tracked by monitoring data from one or more location detection sensors;

for each driver of the plurality of drivers, make a determination to subject the driver to one of multiple sets of rules, including a default set of rules and an alternative set of rules that are associated with a geofenced area, wherein for each driver, the one or more processors make the determination based at least in part on the most recent location of the mobile computing device of the driver relative to the geofenced area, and the operational state of the service application executing on the mobile computing device of the driver;

for each of the plurality of drivers that is subject to the alternative set of rules, add an identifier of the driver to a queue in which multiple drivers are identified by respective identifiers in an order that reflects a relative time when the identifier of the respective driver was added to the queue;

over a given duration, arrange, by the one or more processors, a respective transport service for each of a plurality of requests;

wherein for a first request of the plurality of requests in which a respective pickup location is within the geofenced area, the one or more processors arrange the respective transport service by (i) selecting one of the plurality of drivers that is subject to the alternative set of rules based on the order of the respective identifiers of the queue and not on a proximity of individual drivers of the plurality of drivers to the respective pickup location of the first request, and (ii) communicating the respective pickup location of the first request to the mobile computing device of the selected driver, and (iii) monitoring the selected driver in providing the respective transport service for the first request;

wherein for a second request of the plurality of requests in which a respective pickup location is outside of the geofenced area, the one or more processors arrange the respective transport service by (i) selecting one of the plurality of drivers that is subject to the default set of rules based at least in part on a proximity of the selected driver to the respective pickup location of the second request, (ii) communicating the respective pickup location to the mobile computing device of the selected driver, and (iii) monitoring the selected driver in providing the respective transport service for the second request.

12. The service arrangement system of claim 11, wherein the one or more processors further use the set of instructions to:

generate a record to count a number of times each of the plurality of drivers enter the geofenced area to provide transport services.

13. The service arrangement system of claim 11, wherein the one or more processors further use the set of instructions to:

generate a record to count a number of pickups and drop-offs performed by each of the plurality of drivers within the geofenced area.

14. The service arrangement system of claim 11, wherein the one or more processors further use the set of instructions to:

determine the alternative set of rules by accessing a database that stores information about the geofenced area, the information including an identifier of an entity associated with the geofenced area.

15. The service arrangement system of claim 11, wherein the one or more processors make the determination based at least in part on a period of time in which the driver is located within the geofenced area.

* * * * *